(12) United States Patent
Meijer et al.

(10) Patent No.: US 7,624,374 B2
(45) Date of Patent: Nov. 24, 2009

(54) READERS AND SCANNER DESIGN PATTERN

(75) Inventors: Henricus Johannes Maria Meijer, Mercer Island, WA (US); Paul A. Vick, Seattle, WA (US); Amanda Silver, Seattle, WA (US); Chris A. Suver, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 914 days.

(21) Appl. No.: 11/214,716

(22) Filed: Aug. 30, 2005

(65) Prior Publication Data

US 2007/0074162 A1 Mar. 29, 2007

(51) Int. Cl.
*G09F 9/44* (2006.01)
*G09F 7/00* (2006.01)
(52) U.S. Cl. .................... 717/116; 702/103 R
(58) Field of Classification Search ............ 717/116; 707/103 R
See application file for complete search history.

(56) References Cited

U.S. PATENT DOCUMENTS

| | | | |
|---|---|---|---|
| 5,832,498 A * | 11/1998 | Exertier | 707/103 R |
| 5,835,757 A * | 11/1998 | Oulid-Aissa et al. | 707/10 |
| 5,835,904 A | 11/1998 | Vicik et al. | |
| 5,857,197 A * | 1/1999 | Mullins | 707/103 R |
| 6,052,688 A * | 4/2000 | Thorsen | 707/100 |
| 6,480,856 B1 | 11/2002 | McDonald et al. | |
| 6,611,840 B1 | 8/2003 | Baer et al. | |
| 6,891,552 B1 | 5/2005 | Bush | |
| 6,999,956 B2 * | 2/2006 | Mullins | 707/2 |
| 2002/0112223 A1 | 8/2002 | Brobst et al. | |
| 2003/0131338 A1 | 7/2003 | Georgalas | |
| 2005/0021998 A1 | 1/2005 | Fiedler et al. | |
| 2005/0091256 A1 | 4/2005 | Rathakrishnan et al. | |
| 2005/0131926 A1 | 6/2005 | Chakraborty et al. | |
| 2005/0216503 A1 * | 9/2005 | Charlot et al. | 707/103 R |
| 2006/0085852 A1 * | 4/2006 | Sima | 726/22 |

FOREIGN PATENT DOCUMENTS

CA 1232075 1/1988

OTHER PUBLICATIONS

Scott Mitchell, "Specialized Collections", Accessible at: http://aspnet.4guysfromrolla.com/articles/062205-1.aspx, last accessed Sep. 29, 2005, 4 pages.
Lamont Adams, "Getting To Know The .NET Collections", accessible at: http://www.builderau.com.au/program/windows/soa/Getting_to_know_the_NET_collections/0,39024644,20265230,00.htm, last accessed Sep. 29, 2005, 3 pages.
"Collections, Containers, and Path Expressions", accessible at: http://work.lauralemay.com/samples/kaleida.html, last accessed Sep. 29, 2005, 9 pages.
Peter Golde, "Unsealing of Collection Classes", accessible at: http://wintellect.com/WEBLOGS/pgolde/archive/2005/06/08/1456.aspx, Jun. 8, 2005, last accessed Sep. 29, 2005, 1 page.

* cited by examiner

*Primary Examiner*—Wei Y Zhen
*Assistant Examiner*—Chih-Ching Chow
(74) *Attorney, Agent, or Firm*—Workman Nydegger

(57) ABSTRACT

An object-oriented interface for providing access to stored data comprises a data enumeration module that provides an object-oriented view to at least one stored first datum that is not an object created by the interface. The interface also includes a scanning module that cooperates with the data enumeration module to change the view from the stored first datum to another datum. Methods for using the interface are also provided.

13 Claims, 12 Drawing Sheets

READERS AND SCANNER DESIGN PATTERN

BACKGROUND

When writing software applications in a high-level programming language, software engineers often face design problems that can differ in details of their implementations but still lend themselves to the same general solution. A design pattern can provide a general solution that a software engineer can apply to a specific problem at hand to produce a solution. Many design patterns can serve as descriptions or templates that can teach a general approach for how to solve a software design problem.

Design patterns are commonly used in object-oriented software engineering and design. Object-oriented design patterns typically depict high-level relationships or interactions between or among classes or objects. A software engineer can use such a depiction to create classes and objects that adhere to the pattern and write source code that implements desired functionality. High quality source code that implements a basic pattern can be reused in other projects that have similar design problems.

Object-oriented design and programming concepts have proven to be powerful tools for software development. However, use of object-oriented code is not an ideal implementation in every programming context. One of these contexts is the field of relational databases. Relational databases can store and manipulate vast amounts of data very quickly. Among the reasons for these capabilities is the fact that much of the available relational database code and methods has been refined and optimized over a period spanning several decades to remove processing bottlenecks.

Object-oriented applications have a relatively large amount of processing overhead associated with tasks such as object creation. This processing overhead can significantly and negatively impact performance of applications that work with relational databases and performance of the relational databases themselves. A major contributing cause of this overhead is object creation from data retrieved from the relational database. Current object-oriented systems lack the ability to efficiently interact with data sources without incurring large amounts of processing overhead.

SUMMARY

The following presents a simplified summary in order to provide a basic understanding and high-level survey. This summary is not an extensive overview. It is neither intended to identify key or critical elements nor to delineate scope. The sole purpose of this summary is to present some concepts in a simplified form as a prelude to the more detailed description later presented. Additionally, section headings used herein are provided merely for convenience and should not be taken as limiting in any way.

A reader-scanner interface provides an object-oriented view into underlying data without creating an unbounded number of objects that include or encapsulate the data being viewed. The reader-scanner interface can be configured to provide access to a wide variety of data sources, including relational databases, text files, structured data, or any other suitable source. The reader-scanner interface also can provide access to data in more than one linear direction, as well as non-linear movement between or among pieces of data.

A reader-scanner interface provides a windowed, object-oriented view into underlying data. This windowed view can be adjusted to take into account specifics of a structure and type of underlying data. A programmer or a user can adjust the window as needed or desired. Movement of the window can be in more than one direction to provide flexibility in navigating through data.

A programming language and associated compiler can create executable computer programs that include a reader-scanner interface. The included reader-scanner interface provides an object-oriented view into underlying data along with an ability to use viewed data directly. Direct use of data avoids processing overhead associated with unbounded object creation that the executable computer program would otherwise incur.

The disclosed and described components and methods comprise one or more of the features hereinafter described and particularly pointed out in the claims. The following description and the annexed drawings set forth in detail certain specific illustrative components and methods. However, these components and methods are indicative of but a few of the various ways in which the disclosed components and methods can be employed. Specific implementations of the disclosed and described components and methods can include some, many, or all of such components and methods, as well as their equivalents. Variations of the specific implementations and examples presented herein will become apparent from the following detailed description when considered in conjunction with the drawings.

DETAILED DESCRIPTION

Figure 1:
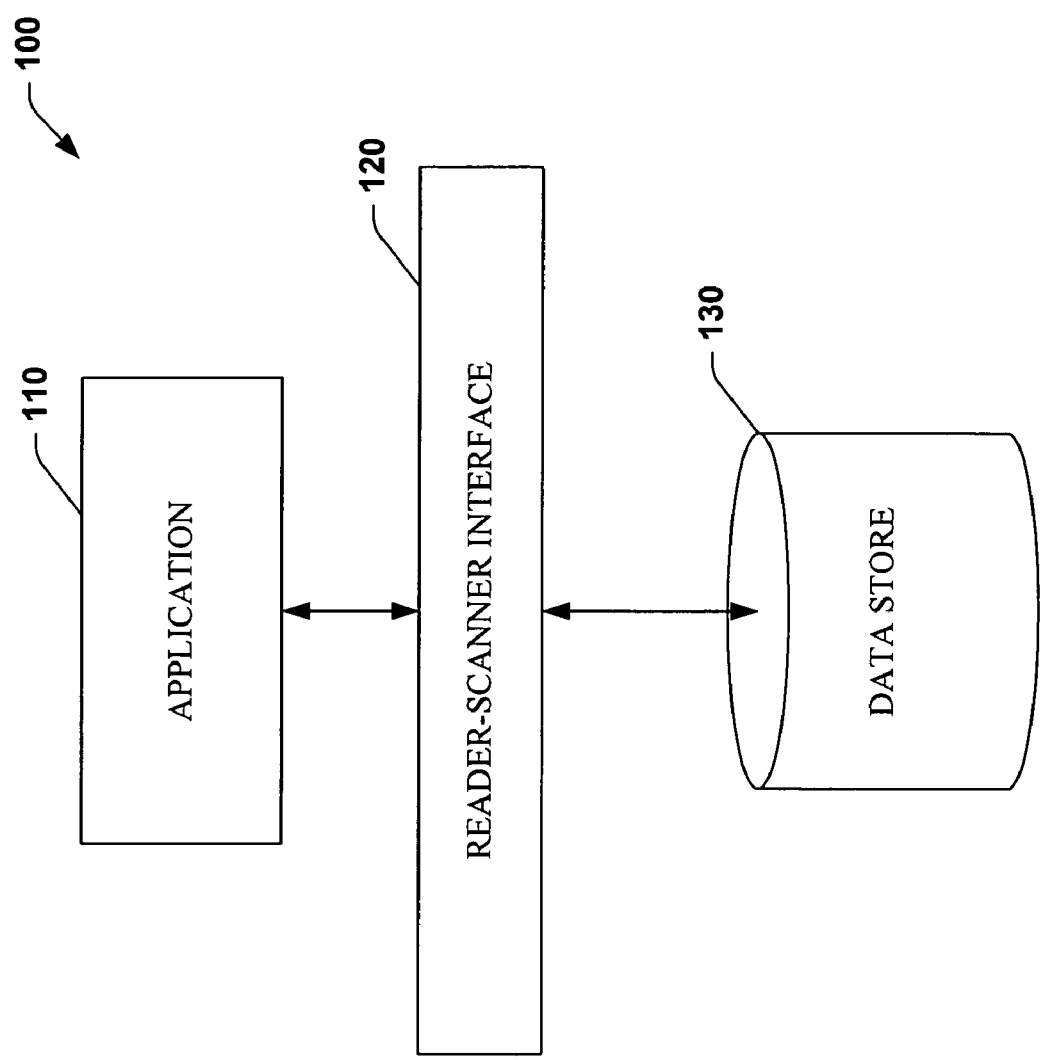
FIG. 1 is a system block diagram of a reader-scanner interface system.

As used in this application, the terms "component," "system," "module," and the like are intended to refer to a computer-related entity, such as hardware, software (for instance, in execution), and/or firmware. For example, a component can be a process running on a processor, a processor, an object, an executable, a program, and/or a computer. Also, both an application running on a server and the server can be components. One or more components can reside within a process and a component can be localized on one computer and/or distributed between two or more computers.

Disclosed components and methods are described with reference to the drawings, wherein like reference numerals are used to refer to like elements throughout. In the following description, for purposes of explanation, numerous specific details are set forth in order to provide a thorough understanding of the disclosed subject matter. It may be evident, however, that certain of these specific details can be omitted or combined with others in a specific implementation. In other instances, certain structures and devices are shown in block diagram form in order to facilitate description. Additionally, although specific examples set forth may use terminology that is consistent with client/server architectures or may even be examples of client/server implementations, skilled artisans will appreciate that the roles of client and server may be reversed, that the disclosed and described components and methods are not limited to client/server architectures and may be readily adapted for use in other architectures, specifically including peer-to-peer (P2P) architectures, without departing from the spirit or scope of the disclosed and described components and methods. Further, it should be noted that although specific examples presented herein include or reference specific components, an implementation of the components and methods disclosed and described herein is not necessarily limited to those specific components and can be employed in other contexts as well.

It should also be appreciated that although specific examples presented may describe or depict systems or methods that are based upon components of personal computers, the use of components and methods disclosed and described herein is not limited to that domain. For example, the disclosed and described components and methods can be used in a distributed or network computing environment. Additionally or alternatively, the disclosed and described components and methods can be used on a single server accessed by multiple clients. Those of ordinary skill in the art will readily recognize that the disclosed and described components and methods can be used to create other components and execute other methods on a wide variety of computing devices.

FIG. 1 is a system block diagram of a reader-scanner database interface system 100. The reader-scanner interface system 100 can be used to provide an object-oriented view to a datum or data that is not necessarily stored in an object format. Specifically, the stored datum or data can be in any format that can be stored in a relational database. Additionally, the datum or data can be in any format that can be stored in any appropriate data store, including, but not limited to, an object-oriented database, a text file, a comma- or tab-delimited data file, a structured data file, or another suitable data storage format.

The reader-scanner interface system 100 includes an application 110. The application 110 can be a wide variety of executable computer files, including, but not limited to, user applications such as word processors, web browsers, calendar and organizer applications, spreadsheets, presentation software, and multimedia players, among others. The application 110 can also be another kind of executable computer file such as a service, a daemon, a background process, or an operating system, among others. Whatever its function, the application 110 specifically can be created using either object-oriented design techniques, including the use of patterns, or object-oriented coding techniques and languages, or both object-oriented design and coding techniques.

The application 110 can interact with a reader-scanner interface 120. The reader-scanner interface 120 can provide a communication pathway between the application 110 and a data store 130. In particular, the reader-scanner interface 120 provides a mechanism whereby data from the data store 130 can be scanned by the application 110 without creating a new object each time a piece of data from the data store 130 is accessed. When accessing data, current object-oriented interfaces to data stores create an object that includes a copy of each of the data items being accessed. This potentially unbounded object creation, in addition to adding processing overhead and reducing efficiency, creates problems with data consistency. For example, if a datum is accessed by an application using a conventional object-oriented interface, the datum is typically incorporated into an object that is used by the application. That use can be a simple reading of the value of the datum or can include processing and manipulation tasks that can change the value of the datum.

When the value of the datum is changed, the changed value must be written back to the data store to ensure data correctness and data consistency. The process of writing the changed value back to the data store usually includes accessing the changed value by calling a method of an object that includes the changed value of the datum, further increasing processing loads. These additional processing steps, including specifically the creation of a new object for each datum accessed by an application, also imposes low limits on scalability of an application to handle large sets of data.

In this example, as well as others presented in conjunction with other figures, the reader-scanner interface 120 can avoid creating a potentially unbounded number of objects in at least one of several ways. First, the reader-scanner interface 120 can allocate a bounded number of objects so that a known, finite amount of object creation overhead is incurred. Additionally or alternatively, previously allocated objects can be invalidated by the reader-scanner interface 120 to make such invalidated objects available to a system garbage collector. Invalidated objects can also be reused to provide a view for underlying data instead of allocating a new object. Some combination of these approaches is also possible. For the purposes of this disclosure, an approach that is consistent with one of these approaches, or a combination thereof, can be considered to create a bounded number of objects.

The reader-scanner interface 120 provides direct access to data of the data store 130 such that the accessed data can be read, modified, or written to or from the data store 130, as appropriate, without creating an unbounded number of objects to hold a value of the accessed data. Such direct access can allow for an ability to scan over large amounts of data, to scale an application such as the application 110 to deal with large amounts of data without incurring object creation processing overhead, and to more easily move among the accessed data to obtain desired information. Conventional systems provide for unidirectional linear access only. The reader-scanner interface 120 allows for bidirectional movement along a linear data path and also for data windowing.

For example, a conventional object-oriented interface can operate on a principle based upon collections of objects. Such collections can be created through the creation of objects from data accessed from a data source, such as the data store 130 of FIG. 1. This collection can implement an interface, for example, IEnumerable(Of T). The IEnumerable(Of T) interface can be coupled to a second interface, such as IEnumerator(Of T). These two coupled interfaces can be used to access data from a data source and to move through such data during processing tasks.

In this specific example, the IEnumerable(Of T) interface can move through a collection by accessing a method to obtain an enumerator of the collection, such as Get Enumerator( ). The Get Enumerator( ) method can return an IEnumerator(Of T) object that itself is an interface. The IEnumerator (Of T) interface can move sequentially among objects by calling a Move Next( ) As Boolean method. The Move Next( ) method can be used to navigate from one object in a collection to another. When a programmer desires to move from one object to another, the programmer can call the Move Next( ) method. If execution of the Move Next( ) method returns a Boolean true value, this return value indicates that a move from one object to a next object in a collection was successful and that the next object is available for use as a current object for access. That object can be accessed for data processing or other computational tasks using a Current As T method. If the Move Next( ) method returns a Boolean false value, the false return value indicates that the current object is undefined and that no more objects remain in the collection. A Reset( ) method can be called to reset a movement indicator to the beginning of the collection.

Movement through all or some of the objects in a collection can be accomplished by repetitively calling the Move Next( ) method, such as within a while( ) loop. Alternatively, an alternate syntax can be used to obtain functionality of a while( ) loop, such as a For Each statement. For instance, a while( ) loop implementation can be replaced with a For Each implementation, such as in the following exemplary code snippet:

For Each X As T In Xs
  X
Next

The Xs argument can be replaced with any expression that returns a collection, such as IEnumerate, IEnumerator, IEnumerable(Of T), or IEnumerator(Of T), as appropriate. This exemplary code snippet can translate to a while( ) loop that calls the Move Next( ) method and gets the next (current) object for processing.

In the preceding example, each time the Current As T method is called, a new object is created. Consistent with the enumeration pattern, this specific example shows read-only access for data. It is not possible to change the current value of an enumeration. However, if the value is a reference to a value on the heap, it is possible to change the value on the heap. The example also shows forward-only execution. Enumeration through a collection can occur in a forward direction only. Once a value has been passed by, that value cannot be accessed again unless the enumeration of the collection is restarted from the beginning. During enumeration, navigation through a collection can only occur one value at a time. Additionally, if the current value of the enumeration is stored, that value persists even after the enumerator has moved onto the next value in the collection, thereby potentially creating an unbounded number of object instances that are detached from the underlying raw data values.

A reader pattern can have attributes that are similar to the enumeration pattern described above. However, with the reader pattern the current value of the enumeration cannot be stored. In this case, once the reader pattern has moved from one value to the next value, there is no way to view the previous value. This property can be problematic in circumstances where two data values need to be compared.

The reader-scanner interface 120 can be implemented in a similar fashion as the exemplary coupled IEnumerable(Of T) and IEnumerator(Of T) interfaces just described. For example, in accordance with a scanner pattern disclosed and described herein, coupled interfaces called IScannable(Of T) and IScanner(Of T) can be implemented that provide the ability to directly access data without creating an object to hold each datum accessed by a call to the Current As T method. Instead of creating an object, a call to the Current As T method of an implementation of the reader-scanner interface 120, such as by using coupled interfaces like IScannable (Of T) and IScanner(Of T), provides an object-oriented direct access window to the desired data. Through this object oriented direct access window, the desired data can be read, manipulated, and written in a streaming fashion while still preserving an object-oriented view of the data but without the above-mentioned disadvantages of the enumerator pattern.

The following exemplary code snippet depicts a possible implementation of the reader-scanner interface 120. Consider the following code using the For Each syntax convention described above:

```
Dim s As IScannable(Of Customer)
For Each c As Customer In s
  ...
Next
```

In this snippet, an interface IScannable(Of T) creates a collection, s, of type Customer. The collection of type Customer can include one or more objects, c. This exemplary code snippet can generate the following equivalent code:

```
Dim s As IScannable(Of Customer)
Dim t As IScanner(Of Customer)
t = s.GetScanner( )
Try
   While t.MoveNext( )
      Dim c As Customer = t.Current
      ...
   End While
Finally
   t.Dispose( )
End Finally
```

If a type implements IScannable(Of T) more than once, the statement is considered ambiguous and a compile-time error occurs.

It should be noted that For Each statements can be nested to provide an ability to iterate over multiple collections. For example, the following code snippet shows nested For Each statements:

```
For Each X in Xs,
   For Each Y in Ys,
      For Each Z in Zs,
         Next
```

This nested code is equivalent to the following code:
  For Each
    X in Xs
    Y in Ys
    Z in Zs The nested syntax can provide a useful shortcut for a computer programmer or software developer, thereby reducing the amount of typing or other data input operation that is necessary.

In use, the reader-scanner interface system can function as follows. The application 110 can request data from the underlying data store 130. In so doing, the application 110 sends a message to the reader-scanner interface 120 requesting a data access operation be performed. The reader-scanner interface 120 can establish a data connection with the underlying data store 130 if one has not been previously established. The reader-scanner interface 120 obtains a data chunk from the data store 230 and places a copy of that data chunk into an array in memory. The application 110 can use the data of the data chunk in the array in memory and after such use can then indicate that the application 110 is finished with the stored data chunk. If necessary or appropriate, any changed data can be copied back to the data store 130 by the reader-scanner interface 120. The reader-scanner interface 120 can then access another data chunk for the application 110.

Figure 2:
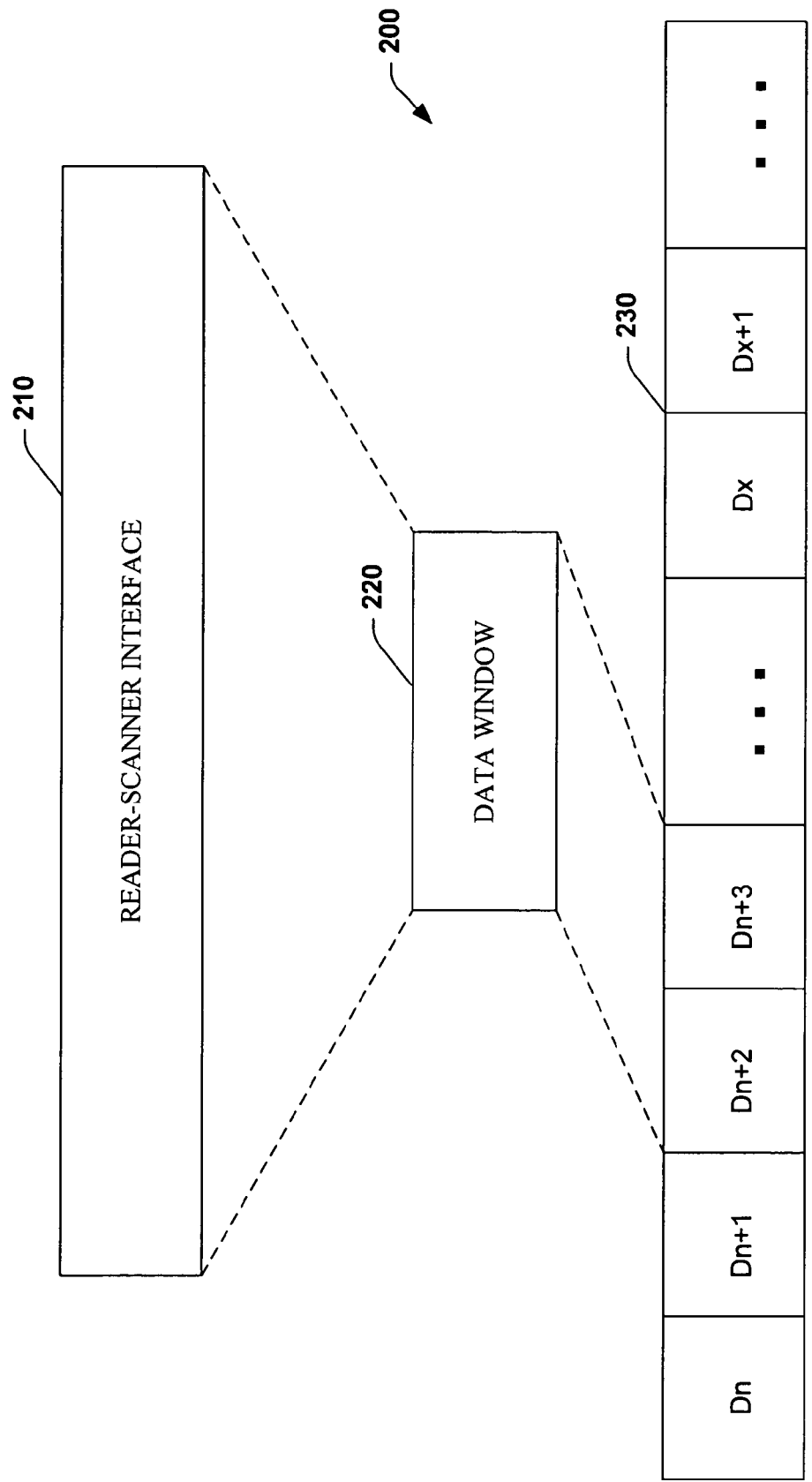
FIG. 2 is a system block diagram of a reader-scanner interface system with a data window.

FIG. 2 is a system block diagram of a reader-scanner interface system 200 with a data window. The reader-scanner interface system 200 can be used to access underlying data from a variety of sources, including a relational database, a text file, a structured data file, or another appropriate source. The included data window provides an ability for a user to define a size or another unit of data that is to be accessed through the data window each time data is obtained.

The reader-scanner interface system 200 includes a reader-scanner interface 210. The reader-scanner interface 210 can be any appropriate reader-scanner interface that provides an object-oriented view to underlying data. Specifically, the reader-scanner interface 210 can be the reader-scanner interface previously described in conjunction with FIG. 1. Such a reader-scanner interface, that does not create a new object each time it is used to access data from an underlying data source, can be especially appropriate for use with a data window as disclosed and described herein.

A data window 220 provides a view to underlying data 230. This view, from the perspective of the reader-scanner interface, is object-oriented. The view is described as object-oriented because the reader-scanner interface 210 supports a variety of functions, such as calls to methods, that traditionally have been described as object-oriented in nature and that are commonly parts of object-oriented programming languages, among others. Additionally, the reader-scanner interface 210 can be implemented as a supported part of an object-oriented programming language or can be supplied as a stand-alone component.

Various aspects of the data window 220 can be defined by a programmer or a user, as appropriate according to a specific implementation. For example, when the reader-scanner interface 210 is implemented as a component of an object-oriented programming language, a programmer or software developer can define a size of the data window 220, increments by which the data window 220 can move, variations on how the data window 220 can move, and so forth. Additionally or alternatively, the programmer or software developer can specify a type of data that is to be accessed through the data window 220.

When specifying a type of data to be accessed, or other attributes of the data window, it can be helpful for the programmer or software developer to have an understanding of the structure or data type of the underlying data being accessed. Although the data window 220, along with the reader-scanner interface 210 is capable of accessing a wide variety of underlying data structures and types, such access makes most sense when performed in accordance with a structure of the underlying data. For example, if the underlying data is a table, a view, or a materialized view from a relational database, the data window 220 can be defined such that the data window 220 accesses a single row at a time, multiple rows at a time, a single column at a time, multiple columns at a time, or even the entire table, view, or materialized view. If the underlying data is part of an image, the data window 220 can be created to access one or more rows of pixels at a time. Similarly, if the underlying data is a book or another document, the data window 220 can be configured to access a single line of text of a single page at a time. Other variations of these examples will be readily apparent to those of ordinary skill in this art upon reading this disclosure.

As mentioned, the underlying data 230 can be in a wide variety of formats. If not previously known to a programmer or software developer, the format of the data or other appropriate attributes of the data, such as data type, can be made discoverable by the system that is providing the data. In an appropriate implementation, such discovery can be made by providing an appropriate descriptor of the data, such as a schema, by object-oriented techniques such as reflection, or by another suitable means. When the reader-scanner interface 210 is implemented as a stand-along module, these attributes can be provided by a user through a series of user interface elements or through configurable preferences or settings, or some combination of both.

In operation, the reader-scanner interface system 200 can function as follows. The reader-scanner interface 210 creates the data window 220 in accordance with attributes that are appropriate for the underlying data 230 that is to be accessed. These attributes are supplied by a programmer or software developer, or a user, as appropriate and depending upon a specific implementation of the reader-scanner interface system 200. The reader-scanner interface 210 uses appropriate access control commands, such as read-only, read-write, or authentication, among others to access a segment of the underlying data 230 through the data window 220. The reader-scanner interface 210 places that accessed data segment into memory, for example, into an array that can be accessed by other components such as a user application. The reader-scanner interface 210 also optionally performs such data control tasks as setting access locks, among others.

The reader-scanner interface 210 then moves the data window 220 to another location in the underlying data store 230 or possibly even to another data store to access additional data. Data control tasks previously performed are undone, such as releasing data locks, and a new set of data is retrieved through the data window 220. The reader-scanner interface 210 then awaits a new command to access data.

Figure 3:
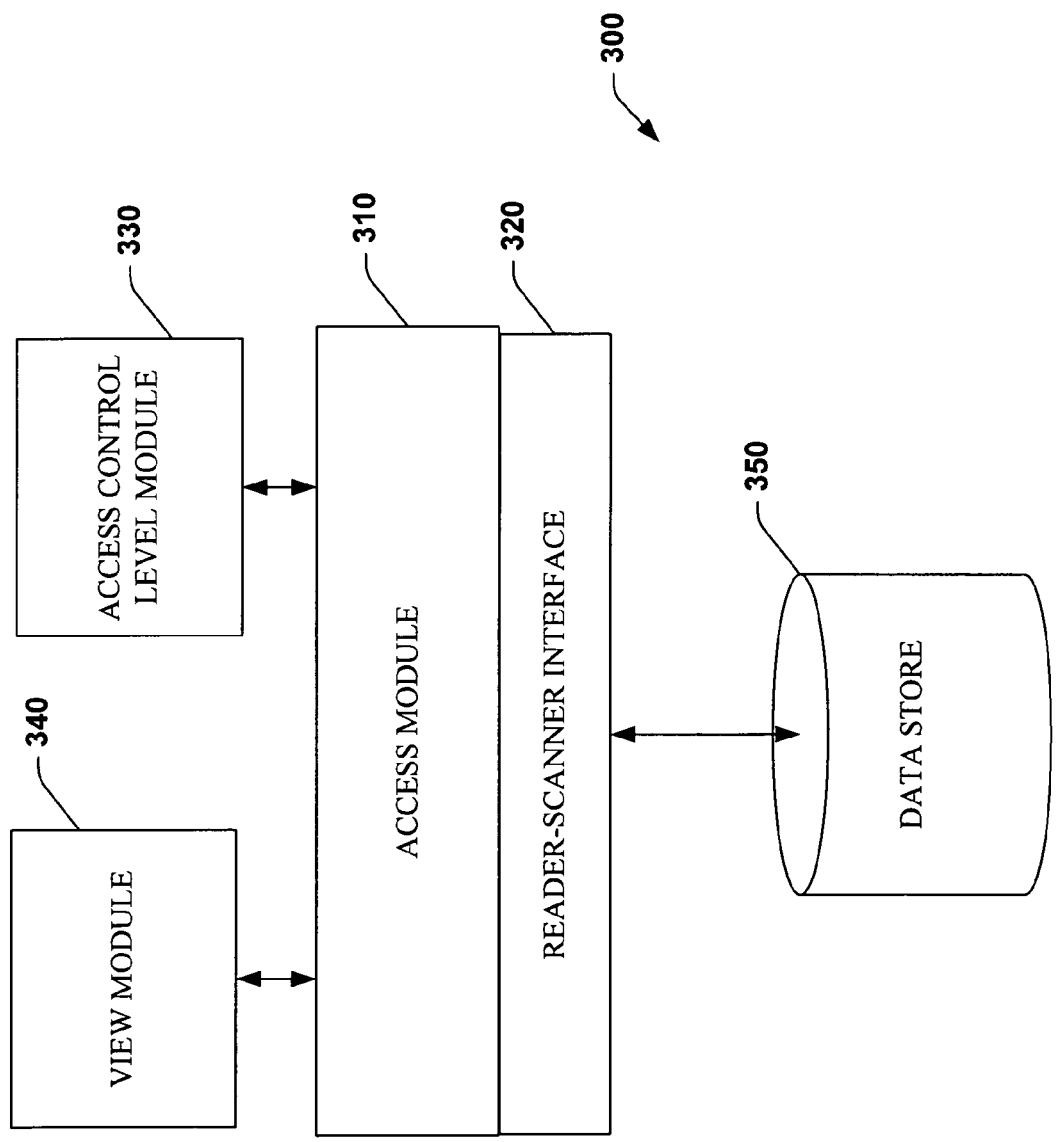
FIG. 3 is a system block diagram of data access system.

FIG. 3 is a system block diagram of a data access system 300. The data access system 300 can use an object-oriented reader-scanner interface, such as one of the reader-scanner interfaces disclosed and described previously in conjunction with other figures, to access data from some data source. Specifically, the data access system 300 can operate in conjunction with other components to provide controlled access to an underlying data store. In this specific example, the underlying data store is a relational database and various components are described with reference to a relational database system or architecture. However, those of ordinary skill in the art will readily recognize, upon reading this disclosure, that the concepts presented in this example, as well as others herein, can be easily adapted in apparent ways to use other forms of data stores.

The data access system 300 includes an access module 310. The access module 310 includes a reader-scanner interface 320. The reader-scanner interface can be any appropriate object-oriented reader-scanner interface. Specifically, an object-oriented reader-scanner interface that does not create a new object upon every data access, such as any of the reader-scanner interfaces that have been previously disclosed or described in conjunction with other figures, can be used.

An access control module 330 can be coupled to the access module 310. The access control module can be used to protect data integrity by controlling access to underlying data 350 in a variety of ways and at a variety of levels. For example, the access control module 330 can perform credentialing tasks to ensure that only authorized users can access the underlying data 350. These credentialing tasks can include user authentication of any of the types that are commonly found in controlled access systems. Specifically, the access control module 330 can use a security scheme that operates according to one or more security paradigms of who you are, what you know, or what you have.

Components that can be used in implementations based upon the security paradigm of "who you are" include a variety of biometric-based devices, such as fingerprint scanners and retina scanners, among others. For implementations using the "what you know paradigm," a user name and password authentication system can be employed. In the category of implementations based upon "what you have" are systems that use security tokens and proximity detectors, such as radio frequency identification (RFID) tag-based systems. According to a desired level of security, one or more of the foregoing systems can be combined as part of the access control module 330.

The access control module 330 can serve as a gatekeeper to the underlying data 350. In order for a user to be able to access and use the data, the user must verify his authority to use the system by appropriately responding to security challenges. According to a specific implementation, such responses can be provided through a specified user interface or through another appropriate means.

The access control module 330 can monitor execution of data access operations for consistency with predefined user privilege levels. Specifically, the access control module 330 can check to see if the operation to be performed by a user of the access module 310 is attempting, during execution, to access components or perform tasks that are reserved for other processes or are otherwise not permitted, such as accessing a restricted or prohibited table or view, among others. If not, the access control module 330 can prevent, interrupt, or halt execution of the operation. Additionally, the access control module 330 can perform various related tasks such as logging events such as suspected privilege escalation attacks and prompting end users with warnings.

At a low level, the access control module 330 can ensure that appropriate tasks, such as specifying read-only or read-write access to the underlying data 350 are performed. Additionally or alternatively, other tasks, such as setting and releasing data access locks can be performed by the access control module 330. Also, the access control module 330 can perform data consistency and integrity tasks, such as transaction updates, or provide information to other components that perform these tasks, such as components of a relational database system.

A view module 340 can work with the access module 310 and the access control module 340 to define a specified or requested view into the underlying data 350. For example, the view module 340 can create a query to be submitted to a relational database system for access to the underlying data 350. The view module 340 can also provide needed data attribute values or descriptors to the reader-scanner interface 320 of the access module 310 so that the reader-scanner interface 320 can obtain information access to the underlying data 350 in a logical and consistent fashion.

When functioning, the data access system 340 can operate as follows. The view module can provide a query and data attributes to the access module 310. The access module 310 obtains needed access information, including, if appropriate, access credentials and other access information as described above, among others. The access module 310 passes the data attributes to the reader-scanner interface 320 which configures itself accordingly. The access module 310 passes the query from the view module to a relational database, which creates the underlying data 350. The reader-scanner interface 320 then accesses the underlying data 350. When finished, the access control module releases any resources under its control, such as releasing locks, among other things.

Figure 4:
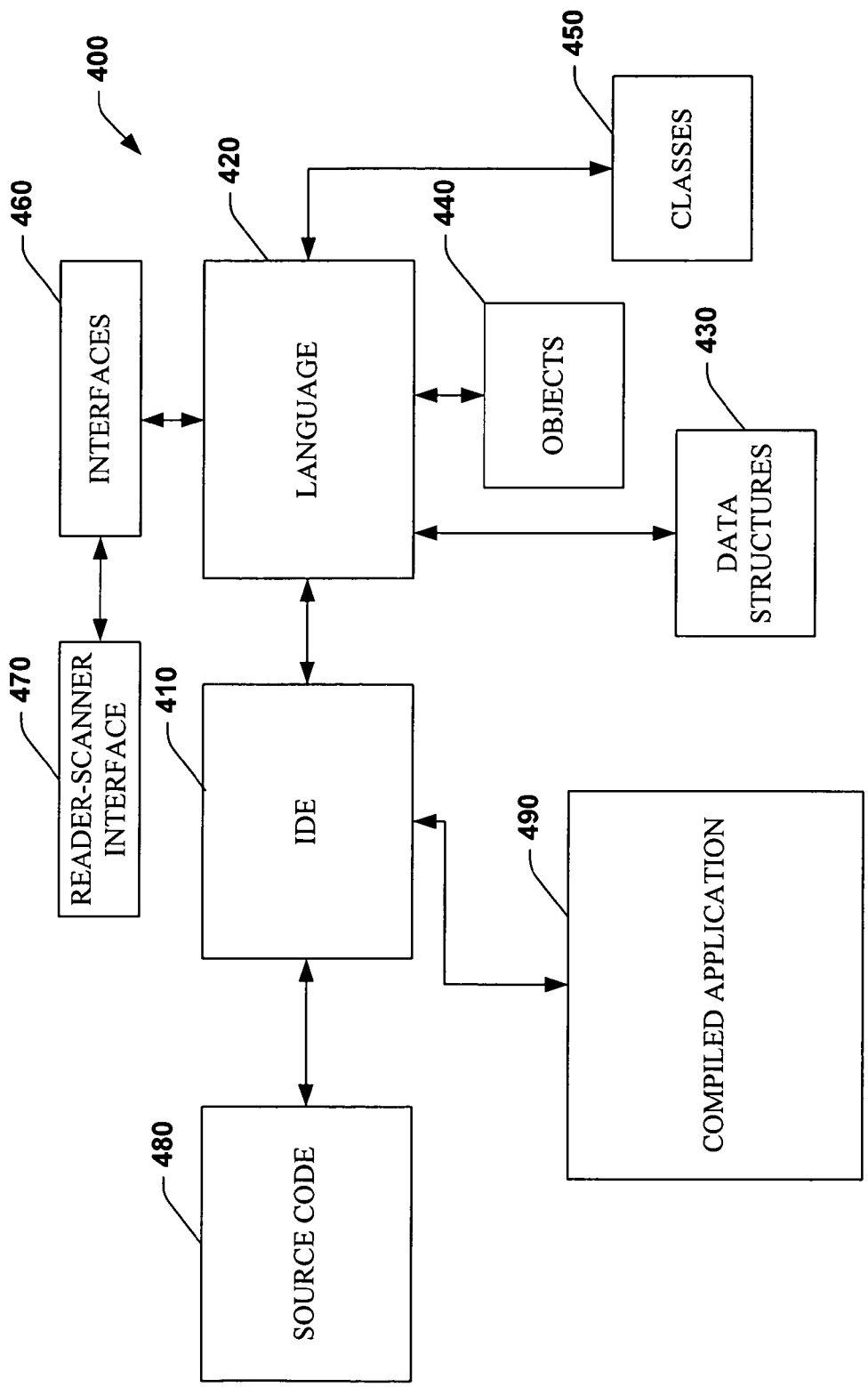
FIG. 4 is a system block diagram of a software development system for a programming language that includes support for an object-oriented reader-scanner interface.

FIG. 4 is a system block diagram of a software development system 400 for a programming language that includes support for an object-oriented reader-scanner interface. The software development system 400 can provide a platform for a computer programmer or a software developer to create software. The software created can be object-oriented and can specifically include a reader-scanner interface, such as any of the reader-scanner interfaces previously disclosed and described in conjunction with other figures.

The software development system 400 includes an integrated development environment 410. The integrated development environment 410 can include such components as text editors, syntax checkers, syntax highlighters, intelligent development assistants, compilers, linkers, debuggers, and project managers, among others. Ideally, the integrated development environment 410 can provide every tool needed by a programmer or software developer to create a software application. At a minimum, the integrated development environment 410 should provide compilation abilities for a programming language that includes support for a reader-scanner interface, such as any of the reader-scanner interfaces previously disclosed and described in conjunction with other figures.

The integrated development environment 410 includes the ability to use a high-level programming language 420. The high-level programming language 420 can be a pure or hybrid object-oriented programming language or can be another suitable programming language. The high-level programming language can include such features or attributes such as data structures 430, objects 400, and classes 450. Additionally, the high-level programming language 420 can include interfaces 460. Among the interfaces 460 that can be included is a reader-scanner interface 470.

Much as previously disclosed or described above, the reader-scanner interface 470 can be an object-oriented interface that does not instantiate or otherwise create a new object when accessing an underlying piece of data. Rather, the reader-scanner interface 470 provides an object-oriented view into the piece-of data while permitting direct access to that data. This direct access can mean that the data can be directly read or written, among other things. Source code 480 for a computer program can be created by, or otherwise accessed for use by, the integrated development environment 410. The source code 480 can be processed by the integrated development environment In operation, the software development system 400 can function as follows. Source code 480 can include code for data structures 430, objects 440, classes 450, interfaces 460, and specifically includes code for the reader-scanner interface 470. Such source code 480 is accessed by the integrated development environment 410. The source code is written in the high-level programming language 420. The integrated development environment 410 processes the source code 480 in accordance with various processing or compiling rules and produces the compiled application 490 that includes an implementation of the reader-scanner interface 470.

Figure 5:
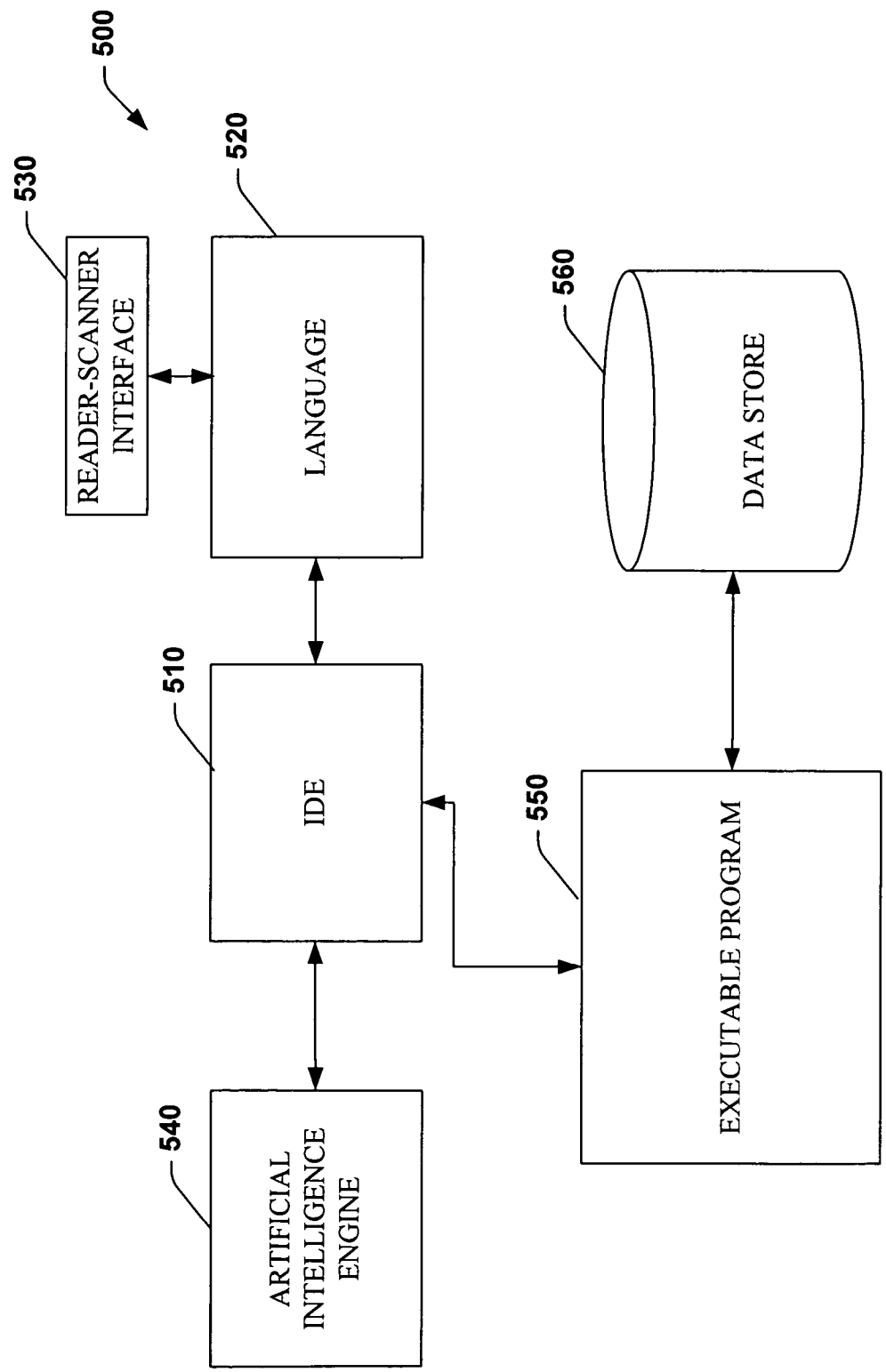
FIG. 5 is a system block diagram of a software development system with an artificial intelligence component.

FIG. 5 is a system block diagram of a software development system 500 with an artificial intelligence component. The artificial intelligence component can be used to bolster or otherwise support operation of the software development system. Specifically, the artificial intelligence component can be used to assist in source code creation tasks like suggesting statement completions or identifying coding errors. Additionally or alternatively, the artificial intelligence component can be used to improve compiling tasks.

The software development system 500 includes an integrated development environment 510. The integrated development environment 510 can include such components as text editors, syntax checkers, syntax highlighters, intelligent development assistants, compilers, linkers, debuggers, and project managers, among others. Ideally, the integrated development environment 510 can provide every tool needed by a programmer or software developer to create a software application. At a minimum, the integrated development environment 510 should provide compilation abilities for a programming language that includes support for a reader-scanner interface, such as any of the reader-scanner interfaces previously disclosed and described in conjunction with other figures.

The integrated development environment can specifically provide compilation support for a high-level programming language 520. This high-level programming language 520 can be an object-oriented programming language, a hybrid object-oriented programming language, or another suitable programming language. A reader-scanner interface 530 can be included as part of the high-level programming language 520.

An artificial intelligence engine 540 can be coupled to the integrated development environment 510. The artificial intelligence engine 540 can provide a variety of support tasks during software development. For example, when a computer programmer or software developer is writing source code, the artificial intelligence engine 540 can be used to identify coding mistakes or to provide coding shortcuts such as suggested term or statement completions, among others. During compilation, the artificial intelligence engine 540 can be used to identify coding patterns and guide code optimization tasks.

The artificial intelligence engine 540 can be implemented in a variety of ways. For example, identifying coding errors or making suggestions for term or statement completions can be carried out by a neural network, an expert system, a rules-based processing component, or a support vector machine (SVM), among others. Additionally, these components can be used to analyze source code to be compiled to identify potential optimizations.

A classifier is a function that maps an input attribute vector, X=(x1, x2, x3, x4 . . . xn), to a confidence that the input belongs to a class, that is, f(X)=confidence(class). Such a classification can employ a probabilistic and/or statistical-based analysis (for example, factoring into the analysis utilities and costs) to prognose or infer an action that a user desires to be automatically performed. In the case of an end-user programming module, patterns of events can be classified to determine whether to take one or more specified actions. Other patter-matching tasks can also be employed as will be evident to an artisan of ordinary skill upon reading this disclosure.

An SVM is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, and probabilistic classification models providing different patterns of independence can be employed. Classification as used herein also includes statistical regression that is utilized to develop models of priority.

As will be readily appreciated from the subject specification, components disclosed or described herein can employ classifiers that are explicitly trained (for example, by a generic training data) as well as implicitly trained (for example, by observing user behavior, receiving extrinsic information). For example, SVMs are configured by a learning or training phase within a classifier constructor and feature selection module. Thus, the classifier(s) can be used to automatically perform a number of functions including but not limited to making coding suggestions or identifying coding errors, as well as assisting during compilation of source code.

With reference to FIGS. 6-10, flowcharts in accordance with various methods or procedures are presented. While, for purposes of simplicity of explanation, the one or more methodologies shown herein, for example, in the form of a flow chart, are shown and described as a series of acts, it is to be understood and appreciated that neither the illustrated and described methods and procedures nor any components with which such methods or procedures can be used are necessarily limited by the order of acts, as some acts may occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology or procedure.

Figure 6:
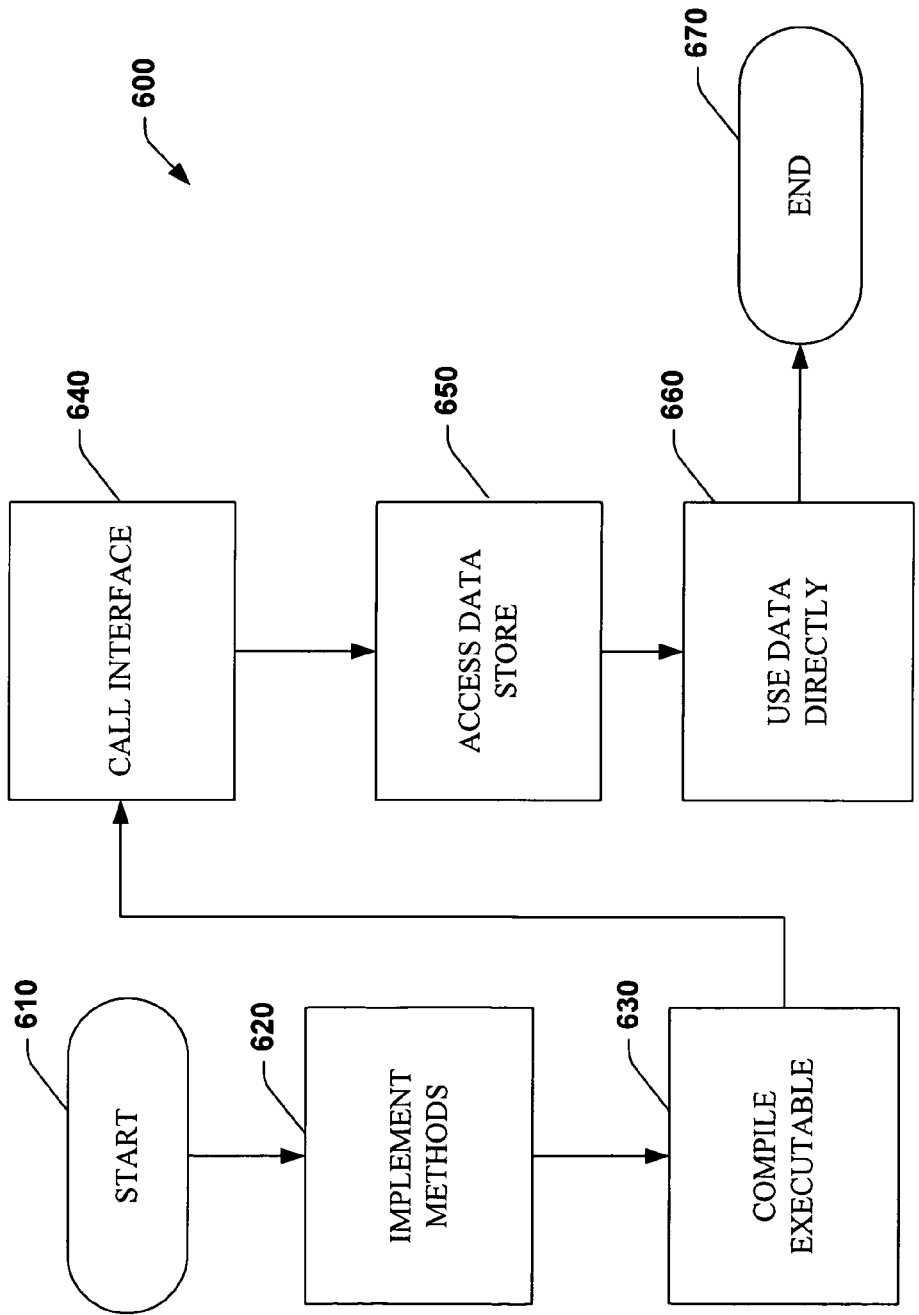
FIG. 6 is a flow diagram depicting a general processing flow of a method that can be employed in accordance with components that are disclosed and described herein.

FIG. 6 is a flow diagram of a method 600 of using an object-oriented interface to directly access underlying data. The method 600 can be used in an object-oriented computing environment to access underlying data without creating an object to refer to or contain such data every time the underlying data is accessed. Specifically, the underlying data can be in any logical format, including a relational database structure.

Processing of the method begins at START block 610 and continues to process block 620. At process block 620, abstract methods of a well-defined object-oriented reader-scanner interface are implemented by a computer programmer or a software developer. An executable computer application is compiled using this implementation at process block 630. The executable computer application includes the implementation of the reader-scanner interface and can be a user application, a daemon, a service, a background process, or an operating system, among others.

At process block 640, the application calls the reader-scanner interface to access some underlying data source. As explained previously in conjunction with other figures, the underlying data source can be a relational database, a text file, a structured data source, or some other suitable data source. The underlying data source is accessed by the reader-scanner interface of the application at process block 650. At process block 660, data from the underlying data source is accessed and used directly. Processing concludes at process block 670.

Figure 7:
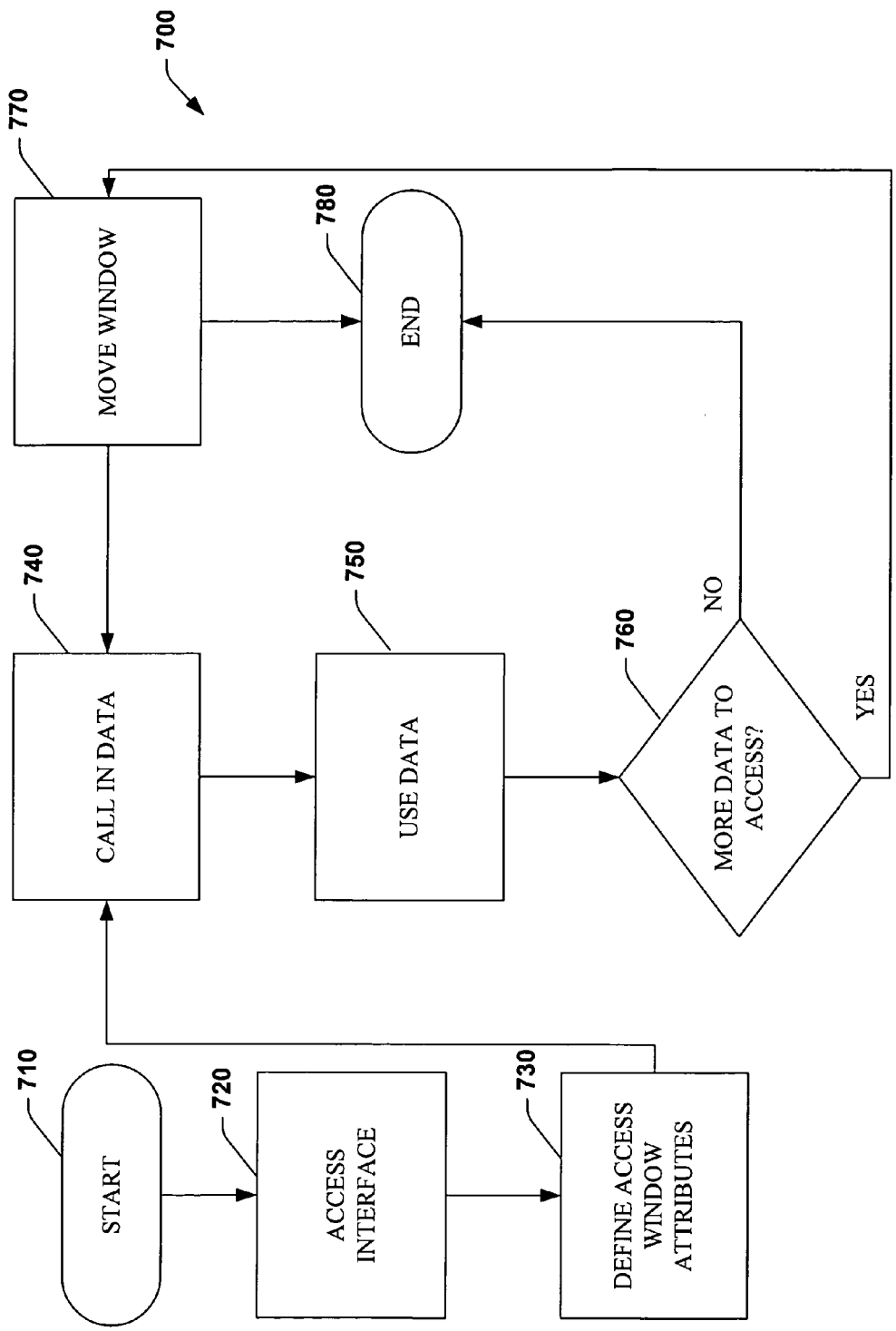
FIG. 7 is a flow diagram depicting a general processing flow of a method that can be employed in accordance with components that are disclosed and described herein.

FIG. 7 is a flow diagram of a method 700 that can be used to directly access data through a data window. The data window can be defined to provide a controlled object-oriented view of underlying data that can be used directly. Also, the data window can be moved in any appropriate direction needed for a data processing task.

Execution of the method 700 begins at START block 710 and continues to process block 720. At process block 720, a reader-scanner interface is accessed. The reader-scanner interface can be any of the reader-scanner interfaces disclosed or described previously in conjunction with other figures. At process block 730, attributes of a data window of the reader-scanner interface are set as appropriate for accessing a particular underlying data store. Data from that underlying data store is accessed and stored in an in-memory array at process block 740.

At process block 750, the accessed data is used directly without first accessing an object that includes or encapsulates the data. At decision block 760, a determination is made whether there is more data to access. If this determination is yes, processing continues to process block 770 where the data window is moved such that a next piece of data can be accessed. Processing from process block 770 continues to process block 740 where the data that is now viewable through the data window is accessed. If the determination made at decision block 760 is no, indicating that data processing tasks have concluded, processing terminates at END block 780.

Figure 8:
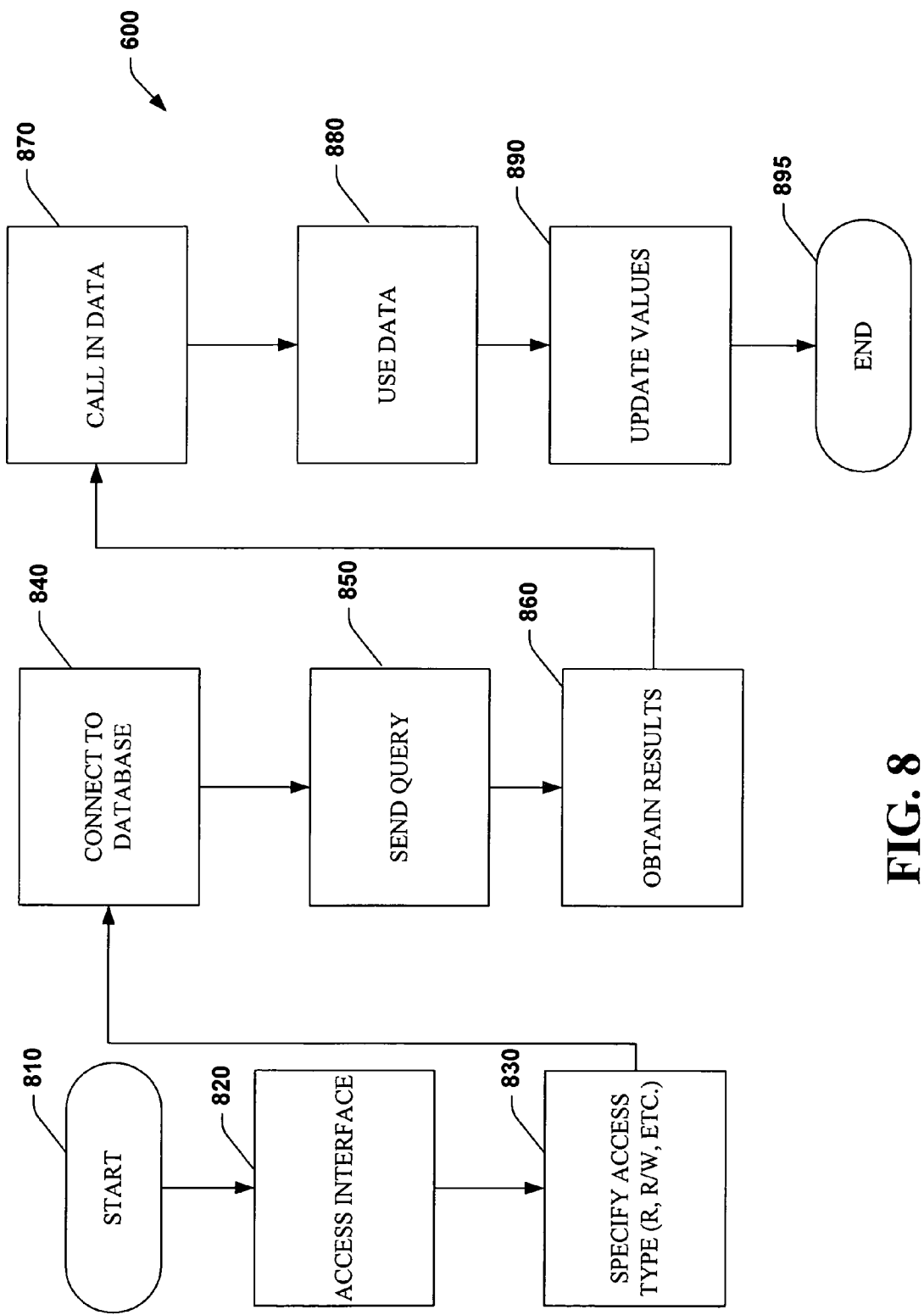
FIG. 8 is a flow diagram depicting a general processing flow of a method that can be employed in accordance with components that are disclosed and described herein.

FIG. 8 is a flow diagram of a method 800 that can be used in conjunction with systems and components that have are disclosed or described herein. The method 800 can be used to obtain and access underlying data. Specifically, the underlying data can be from a relational database or another appropriate data source, such as any of the data sources previously disclosed or described in conjunction with other figures.

Processing of the method 800 begins at START block 810 and continues to process block 820. At process block 820, a reader-scanner interface, such as any of the reader-scanner interfaces that have been previously disclosed or described in conjunction with other figures, is accessed. At process block 830, an access type for data is specified. Processing continues to process block 840 where a connection to a relational database is made. It should be noted that when the data source is other than a relational database, particulars of acts taken or performed in process block 840, as well as others, can be modified as needed.

At process block 850, a query is sent to the relational database. Results of that query are obtained at process block 860. At process block 870, data from the query results are called in through the reader-scanner interface. The data are used in place directly at process block 880. At process block 890, any data values that have been modified are updated with the relational database. Processing concludes at END block 895.

Figure 9:
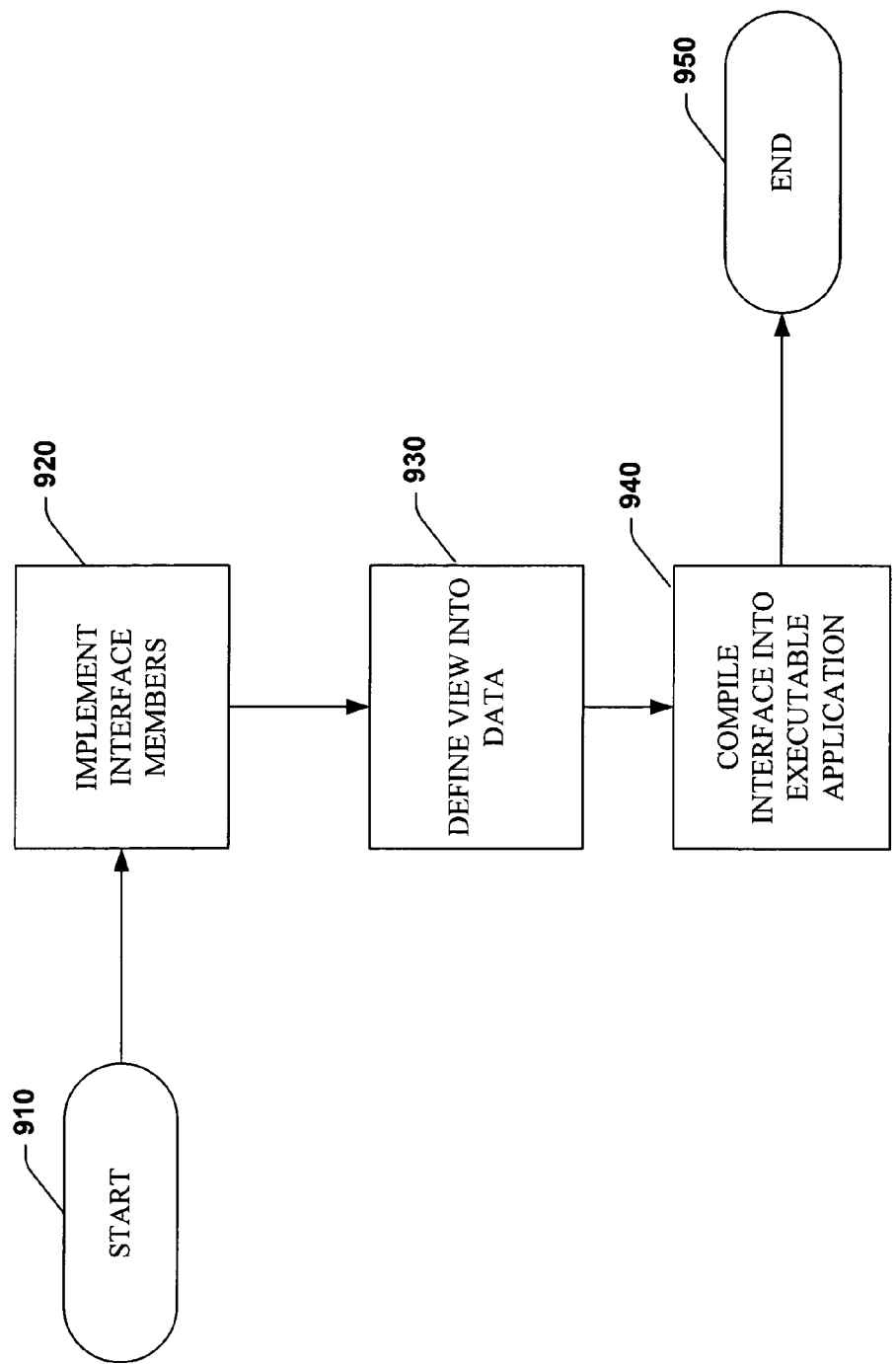
FIG. 9 is a flow diagram depicting a general processing flow of a method that can be employed in accordance with components that are disclosed and described herein.

FIG. 9 is a flow diagram of a method 900 that can be used in conjunction with components or systems that have been disclosed or described herein. The method 900 can be used to add a reader-scanner interface to an executable computer program. The reader-scanner interface can be any of the reader-scanner interfaces that previously have been disclosed or described in conjunction with other figures. The executable computer program can be any executable program, specifically including any of the programs previously disclosed or described here, such as a user program, a daemon, a service, a monitor program, or an operating system, among others.

Processing of the method 900 begins at START block 910 and continues to process block 920. At process block 920, an implementation of methods or other members of an object-oriented reader-scanner interface is created using a high-level programming language, such as an object-oriented programming language. At process block 930, a view through a data window of the reader-scanner interface is defined. Processing continues to process block 940 where the implementation of the reader-scanner interface created in a high-level programming language is compiled into an executable program. Processing of the method 900 concludes at END block 950.

Figure 10:
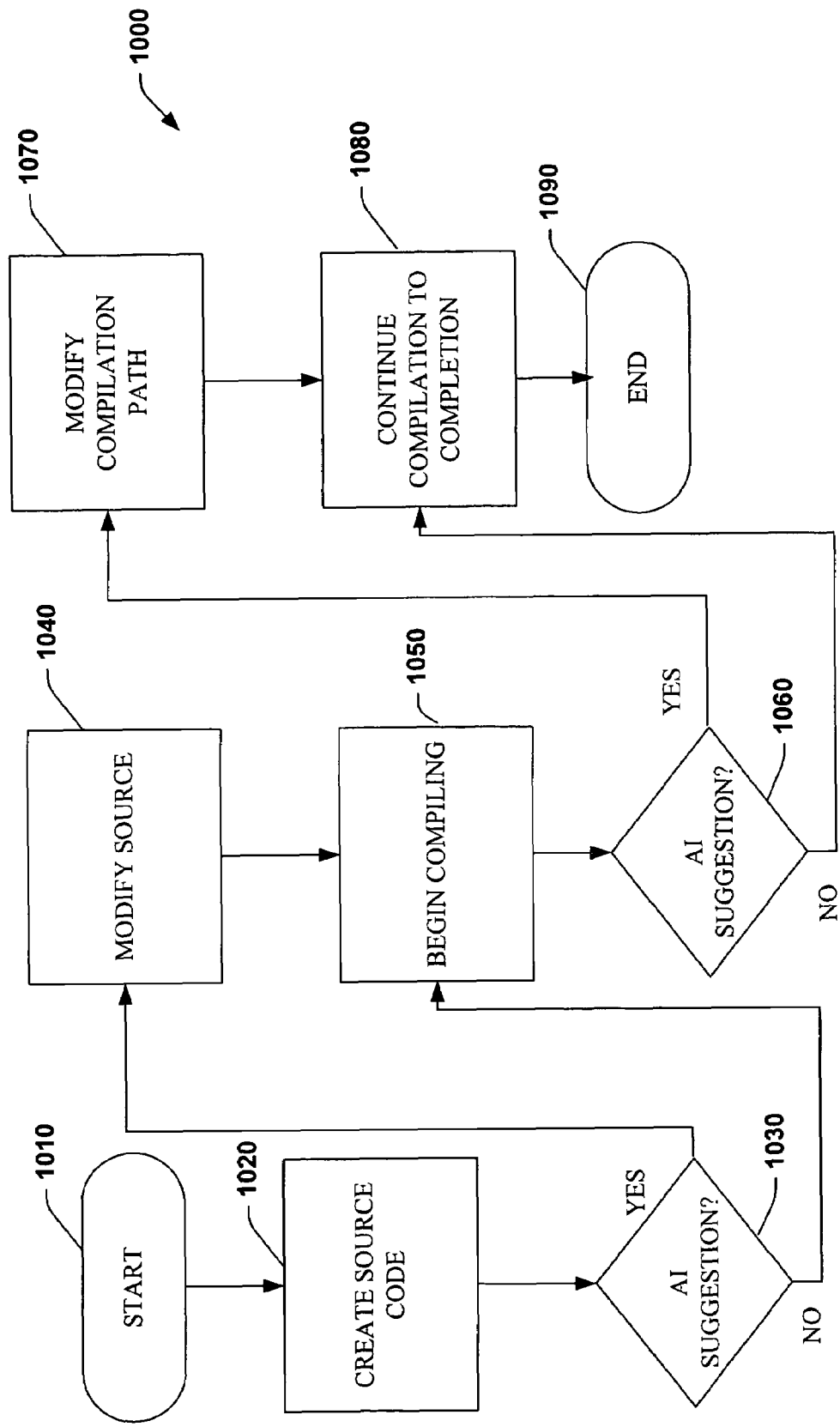
FIG. 10 is a flow diagram depicting a general processing flow of a method that can be employed in accordance with components that are disclosed and described herein.

FIG. 10 is a flow diagram of a method 1000 that can be used in conjunction with components or systems that have been disclosed or described herein in conjunction with other figures. The method can be used with a compiler having artificial intelligence-based components to create an executable computer application that can use a reader-scanner interface. The reader-scanner interface can be any of the reader-scanner interfaces that previously have been disclosed or described in conjunction with other figures.

Processing of the method 100 begins at START block 1000 and continues to process block 1010. At process block 1010, source code that includes an implementation of a reader-scanner interface is created. At decision block 1020, a determination is made whether an artificial intelligence-based component has made a suggestion during or after source code creation. If the determination is yes, processing continues to process block 1040 where a suggestion from the artificial intelligence-based component is incorporated into the source code. If the determination is no, processing continues to process block 1050. Similarly, processing from process block 1040 continues to process block 1050.

At process block 1050, compilation of an executable program begins. Processing continues to decision block 1060 where a determination is made whether an artificial intelligence-based component has suggested a compilation optimization that can be applied. If the determination is yes, processing continues to process block 1070 where an execution path of the compiler is modified to take into account the suggestion from the artificial intelligence-based component. If the determination is no, processing continues at process block 1080 where compilation of the executable program continues until complete. Similarly, processing from process block 1070 continues at process block 1080. Processing of the method 1000 concludes at END block 1090.

Figure 11:
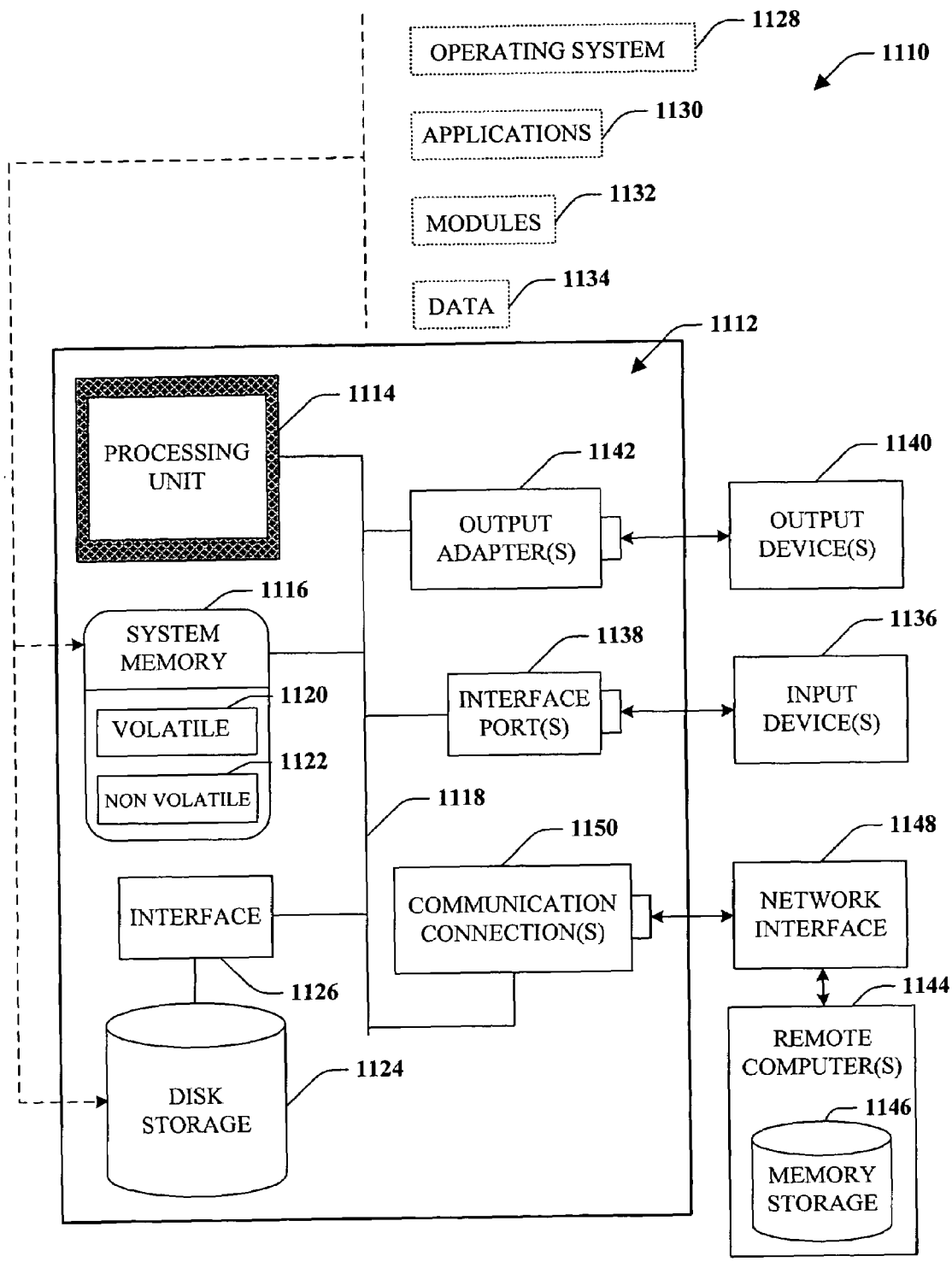
FIG. 11 illustrates an exemplary computing environment.
Figure 12:
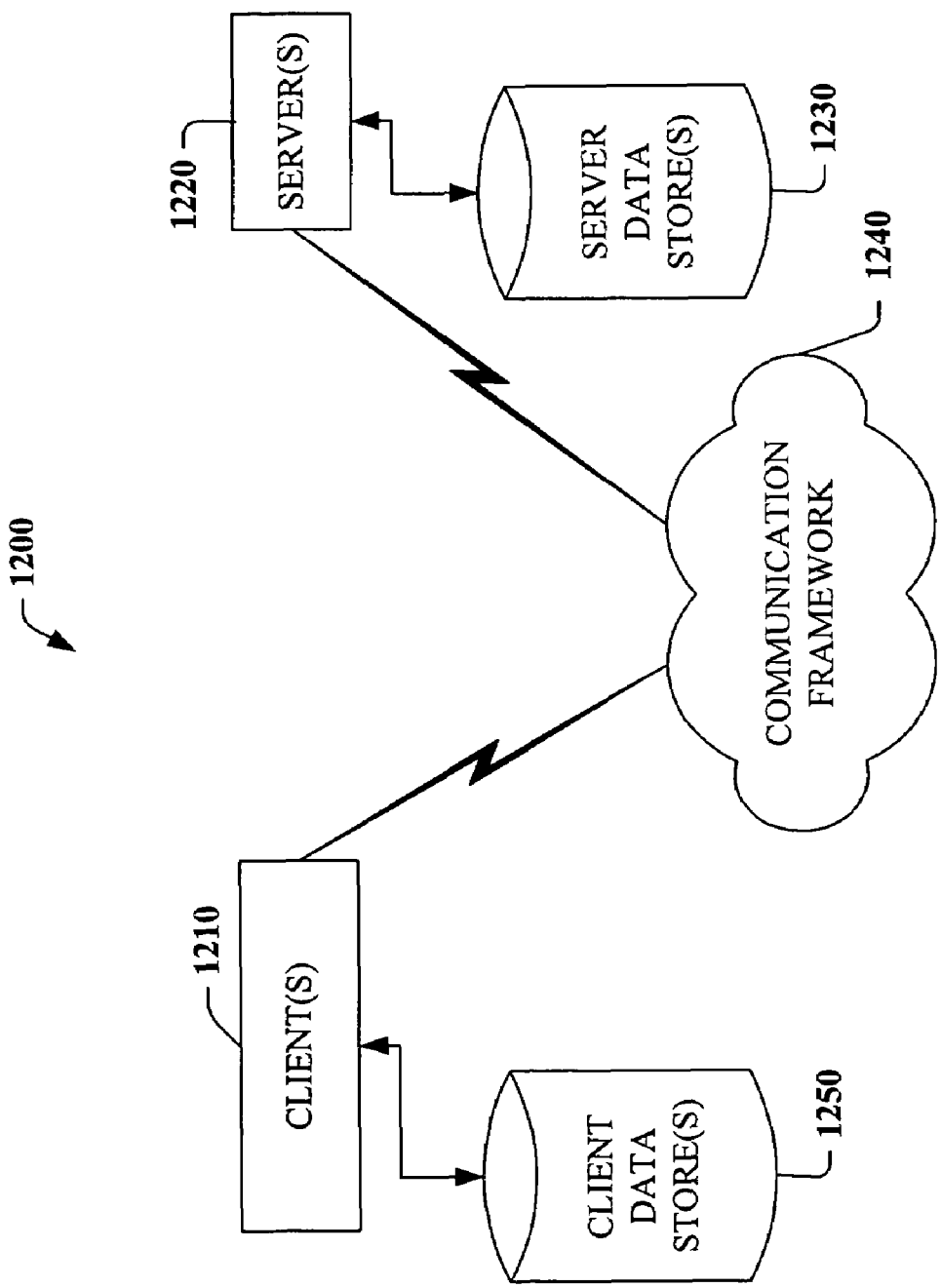
FIG. 12 illustrates an exemplary networking environment.

In order to provide additional context for implementation, FIGS. 11-12 and the following discussion is intended to provide a brief, general description of a suitable computing environment within which disclosed and described components and methods can be implemented. While various specific implementations have been described above in the general context of computer-executable instructions of a computer program that runs on a local computer and/or remote computer, those skilled in the art will recognize that other implementations are also possible either alone or in combination with other program modules. Generally, program modules include routines, programs, components, data structures, etc. that perform particular tasks and/or implement particular abstract data types.

Moreover, those skilled in the art will appreciate that the above-described components and methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. Certain illustrated aspects of the disclosed and described components and methods may also be practiced in distributed computing environments where certain tasks are performed by remote processing devices that are linked through a communications network or other data connection. However, some, if not all, of these aspects may be practiced on stand-alone computers. In a distributed computing environment, program modules may be located in local and/or remote memory storage devices.

With reference to FIG. 11, an exemplary environment 1100 for implementing various aspects of the invention includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/non-volatile computer storage media. For example, FIG. 11 illustrates a disk storage 1124. The disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in the suitable operating environment 1100. Such software includes an operating system 1128. The operating system 1128, which can be stored on the disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the subject invention can be implemented with various operating systems or combinations of operating systems.

A user enters commands or information into the computer 1112 through input device(s) 1136. The input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

FIG. 14 is a schematic block diagram of a sample-computing environment 1400 within which the disclosed and described components and methods can be used. The system 1400 includes one or more client(s) 1410. The client(s) 1410 can be hardware and/or software (for example, threads, processes, computing devices). The system 1400 also includes one or more server(s) 1420. The server(s) 1420 can be hardware and/or software (for example, threads, processes, computing devices). The server(s) 1420 can house threads or processes to perform transformations by employing the disclosed and described components or methods, for example.

One possible means of communication between a client 1410 and a server 1420 can be in the form of a data packet adapted to be transmitted between two or more computer processes. The system 1400 includes a communication framework 1440 that can be employed to facilitate communications between the client(s) 1410 and the server(s) 1420. The client(s) 1410 are operably connected to one or more client data store(s) 1450 that can be employed to store information local to the client(s) 1410. Similarly, the server(s) 1420 are operably connected to one or more server data store(s) 1430 that can be employed to store information local to the server(s) 1340.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A computer program product for use at a computer system the computer program product for implementing a method for accessing stored data, the computer program product comprising one or more computer storage media having stored thereon computer-executable instructions that, when executed by a processor, cause the computer system to perform the method, including the following:

receive, at a reader-scanner interface, a data access request from an object-oriented application, the object oriented application configured to access data in an object format, the data access request requesting access to a portion of data in a data store, the portion of data being stored in a memory array;

provide, at the reader-scanner interface, an object-oriented view to the data store, the object-oriented view permitting the data store to be scanned by the object-oriented application without creating a new object each time the portion of data is accessed from the data store, including:

providing a communication pathway between the object-oriented application and the data store;

allocating a bounded number of objects that can be used by the object-oriented application to access data from the data store such that a finite amount of overhead is incurred to configure object-oriented access to the data store; and utilizing the allocated objects to create a direct access window to the requested portion of data in the data store, the direct access window providing the object-oriented application with an object-oriented view the requested portion of data in the data store, the direct access window created in accordance with the attributes of different data type format;

use appropriate access control commands to authenticate the object-oriented application for access to the portion of data through the direct access window using one of read-only access and read-write access; and return the requested portion of data for use by the object-oriented application in the object format.

2. The computer program product of claim 1, further comprising computer-executable instructions that, when executed, cause the computer system to:

receive a second data access request from the object-oriented application, the second data access request for the portion of data; and reuse one or more of the allocated objects to move the direct access window to the portion of data in the data store.

3. The computer program product of claim 2, further comprising computer-executable instructions that, when executed, cause the computer system to invalidate at least one of the allocated objects prior to reusing the allocated objects to move the direct access window.

4. The computer program product of claim 1, wherein the data store is a relational database.

5. At a computer system, the computer system including a processor and system memory, a method for accessing stored data, the method comprising:

receiving, at a reader-scanner interface, a data access request from an object-oriented application, the object oriented application configured to access data in an object format, the data access request requesting access to a portion of data in a data store, the portion of data being stored in a memory array;

providing, at the reader-scanner interface, an object-oriented view to the data store, the object-oriented view permitting the data store to be scanned by the object-oriented application without creating a new object each time the portion of data is accessed from the data store, including:

providing a communication pathway between the object-oriented application and the data store;

the processor allocating a bounded number of objects that can be used by the object-oriented application to access data from the data store such that a finite amount of overhead is incurred to configure object-oriented access to the data store; and the processor utilizing the allocated objects to create a direct access window to the requested portion of data in the data store, the direct access window providing the object-oriented application with an object-oriented view the requested portion of data in the data store, the direct access window created in accordance with the attributes of different data type format;

using appropriate access control commands to authenticate the object-oriented application for access to the portion of data through the direct access window using one of read-only access and read-write access; and returning the requested portion of data for use by the object-oriented application in the object format.

6. The method of claim 5, further comprising:
receiving a second data access request from the object-oriented application, the second data access request for the portion of data in the data store; and
reusing one or more of the allocated objects to move the direct access window to the portion of data in the data store.

7. The method of claim 6, further comprising invalidating at least one of the allocated objects prior to reusing the allocated objects to move the direct access window.

8. The method of claim 5, wherein the data store is a relational database.

9. The method of claim 8, wherein using appropriate access control commands to access the portion of data through the direct access window comprises accessing the relational database.

10. A computer system, the computer system comprising:
one or more processors;
system memory; and
one or more computer storage media having stored thereon computer-executable instructions representing a reader-scanner interface, the reader scanner interface configured to:
receive a data access request from an object-oriented application, the object oriented application configured to access data in an object format, the data access request requesting access to a portion of data in a data store, the portion of data being stored in a memory array;
provide an object-oriented view to the data store, the object-oriented view permitting the data store to be scanned by the object-oriented application without creating a new object each time the portion of data is accessed from the data store, including:
providing a communication pathway between the object-oriented application and the data store;
allocating a bounded number of objects that can be used by the object-oriented application to access data from the data store such that a finite amount of overhead is incurred to configure object-oriented access to the data store; and
utilizing the allocated objects to create a direct access window to the requested portion of data in the data store, the direct access window providing the object-oriented application with an object-oriented view the requested portion of data in the data store, the direct access window created in accordance with the attributes of the other differ format;
use appropriate access control commands to authenticate the object-oriented application for access to the portion of data through the direct access window, using one of read-only access and read-write access; and
return the requested portion of data for use by the object-oriented application in the object format.

11. The computer system of claim 10, wherein the reader scanner interface is further configured to:
receive a second data access request from the object-oriented application, the second data access request for the portion of data in the data store; and
reuse one or more of the allocated objects to move the direct access window to the portion of data in the data store.

12. The computer system of claim 11, wherein the reader scanner interface is further configured to invalidate at least one of the allocated objects prior to reusing the allocated objects to move the direct access window.

13. The computer system of claim 10, wherein the data store is a relational database.

* * * * *

UNITED STATES PATENT AND TRADEMARK OFFICE
CERTIFICATE OF CORRECTION

| | | |
|---|---|---|
| PATENT NO. | : 7,624,374 B2 | Page 1 of 1 |
| APPLICATION NO. | : 11/214716 | |
| DATED | : November 24, 2009 | |
| INVENTOR(S) | : Henricus Johannes Maria Meijer et al. | |

It is certified that error appears in the above-identified patent and that said Letters Patent is hereby corrected as shown below:

In column 20, line 15, in Claim 10, delete "window," and insert -- window --, therefor.

Signed and Sealed this
Twenty-second Day of February, 2011

David J. Kappos
*Director of the United States Patent and Trademark Office*